Sept. 29, 1970   A. H. JACOBSON   3,530,743
MACHINE TOOL FEED MEANS
Filed March 25, 1968

INVENTOR.
ALDEN H. JACOBSON
BY
*Norris S. Blodgett*
ATTORNEY

United States Patent Office 3,530,743
Patented Sept. 29, 1970

3,530,743
MACHINE TOOL FEED MEANS
Alden H. Jacobson, Princeton, Mass., assignor to The Heald Machine Company, Worcester, Mass., a corporation of Delaware
Filed Mar. 25, 1968, Ser. No. 715,717
Int. Cl. B23b 39/00
U.S. Cl. 77—3                     3 Claims

ABSTRACT OF THE DISCLOSURE

This invention relates to a machine tool and, more particularly, to such apparatus in which the tool is fed into the workpiece for machining operation by use of a hydraulic actuator which operates in incremental movements.

BACKGROUND OF THE INVENTION

In the operation of machine tools, it is common practice to use a hydraulic actuator for producing feed between the tool and the surface which is to be machined. The rate of feed, therefore, can be easily controlled by regulating the flow of fluid through the actuator, this commonly being done by placing a valve or orifice in the exhaust side of the actuator. However, it has been found that at low rates of flow, where a very small orifice would be used, arcuate control of flow becomes very difficult, since in the operation of a cutting tool the feed must be kept at a constant value and also accurately determined, it has been in the past impossible to operate with hydraulic feed at low rates of feed. Also, at low feed rates, it has been found that the tool has a tendency to tear the metal in the workpiece rather than cut it cleanly away as would be true at higher feed rates. These and other difficulties experienced with the prior art devices have been obviated in a novel manner by the present invention.

It is, therefore, an outstanding object of the invention to provide a machine tool having a hydraulic feed which is capable of operating at very slow speeds.

Another object of this invention is the provision of a machine tool in which a hydraulic feed can be controlled accurately even at slow feed rates.

A further object of the present invention is the provision of a machine tool in which the cutting tool removes material from the workpiece even at slow feed rates without tearing.

It is another object of the instant invention to provide a machine tool producing excellent finish even at slow feed rates.

A still further object of the invention is the provision of apparatus for producing accurate flow of fluid to and from a hydraulic actuator of a machine tool.

It is a further object of the invention to provide a valve for producing incremental flow in a hydraulic system.

With these and other objects in view, as will be apparent to those skilled in the art, the invention resides in the combination of parts set forth in the specification and covered by the claims appended hereto.

SUMMARY OF THE INVENTION

In general, the present invention consists of a machine tool having a base, workholder and toolholder along with means for producing relative motion between the workholder and the toolholder to bring about a machining operation. This motion is brought about by a hydraulic apparatus including a hydraulic actuator and means for regulating the flow of hydraulic fluid to and from the actuator in such a manner that the flow takes place in increments or pulses. This is brought about by placing in the exhaust line of the hydraulic actuator a valve having a cam reciprocated plunger which is associated with the hydraulic pressure accumulator. The plunger allows pressure from the actuator to enter the valve and make itself felt in the storage of energy in the accumulator. Then, the plunger cuts off the pressure from the actuator and opens the valve to the exhaust line at which time the accumulator releases the energy into the exhaust line.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
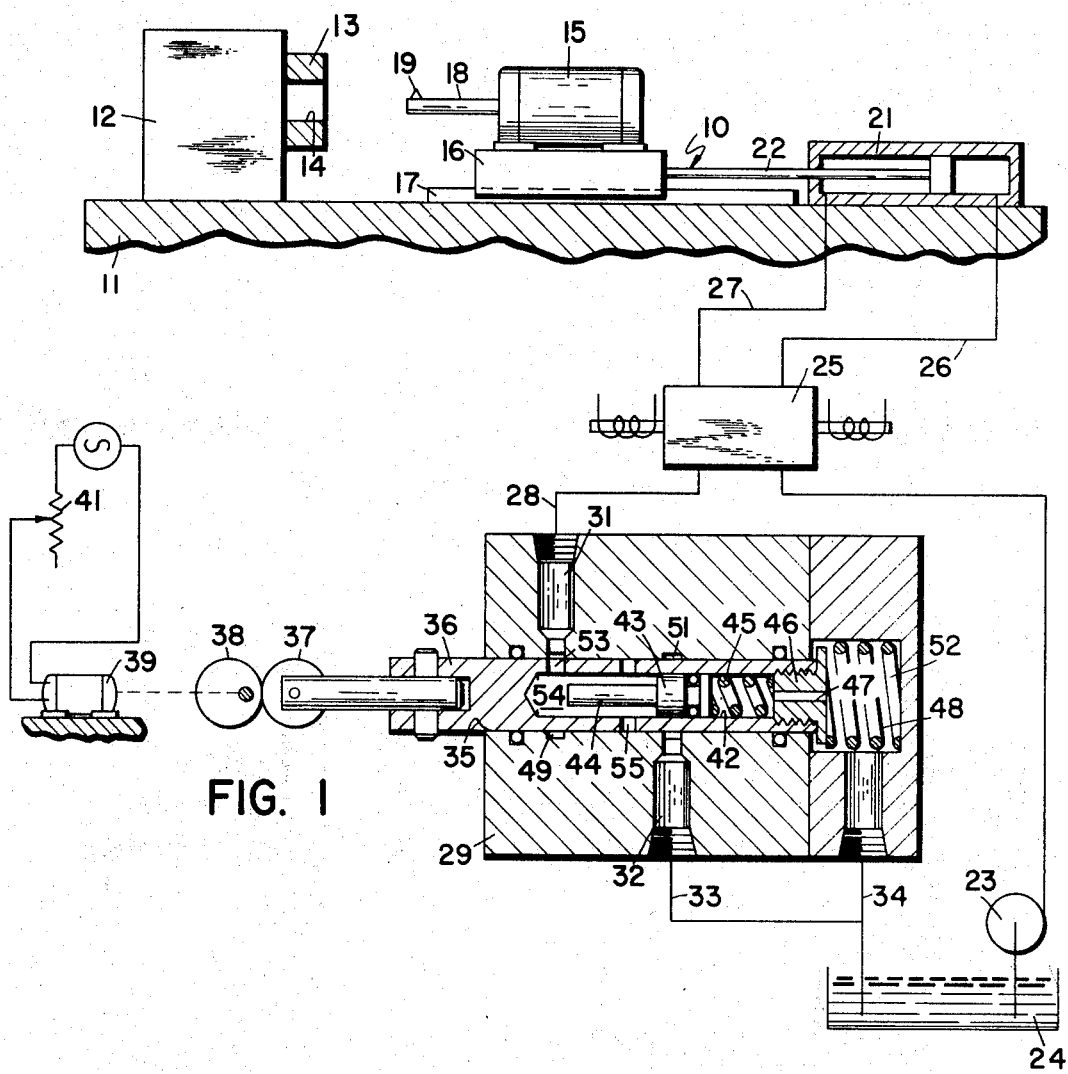
FIG. 1 is a somewhat schematic view of a machine tool embodying the principles of the present invention.

Referring first to FIG. 1, it can be seen that the machine tool, indicated generally by the reference numeral 10, is provided with a base 11 on which is mounted a workholder 12 carrying a workpiece 13 which has a bore 14 whose surface is to be finished. Also mounted on the base is a toolholder 15 mounted on a table 16 which is slidably mounted on ways 17 formed on the upper surface of the base 11. The toolholder 15 is in the form of a boring head 15 having a spindle 18 at the outer end of which is carried a radially-extending single point tool 19. The ways 17 are set up to move the tool 19 longitudinally of the axis of the bore 14 in the workpiece.

Also mounted on the base 11 is a hydraulic actuator, such as a cylinder 21, whose piston rod 22 is connected to the table 16 to produce the longitudinal feeding motion of the tool 19 into the workpiece 13 for a machining operation.

The cylinder 21 is provided with a hydraulic circuitry including a pump 23 whose input side is connected to a reservoir 24 and whose output line is connected through a reversing valve 25 and a conduit 26 to the outboard end of the cylinder 21. The inboard end of the cylinder 21 is connected by a conduit 27 to the reversing valve 25 which, in turn, is connected by a conduit 28 to a flow control valve 29. The conduit 28 is connected to an inlet port 31 of the valve, while an outlet port 32 is connected by a conduit 33 to the reservoir 24. In addition, a drain line 34 is also connected from the valve 29 to the reservoir 24.

The valve 29 is provided with a bore 35 and in this bore is slidably mounted a plunger 36. On the other end of the plunger is mounted a cam follower 37 which engages a cam 38. The cam is rotated by an electric motor 39 whose speed is regulated by a variable resistor 41 or like means as is well known in the electric motor art. The inner end of the plunger 36 is provided with a longitudinally extending bore 42 in which is mounted a slidable piston 43. The piston is provided with an elongated stem 44 which engages on occasion the inner end of the bore 42. From the other side of the piston 43 extends a compression spring 45 which is pressed against a plug 46 threaded into the outer end of the bore 42. The plug 46 has a small passage 47 for the release of such oil as may escape past the piston 43. This oil goes through the passage 47 into a chamber 48 which is connected through the conduit 34 to the reservoir 24. The inlet port 31 is connected directly to an annular groove 49 formed in the wall of the bore 35, while the outlet port 32 is connected to a similar groove 51. A spring 52 maintains the plunger 36 continually pressed to the left in FIG. 1 against the surface of the cam 38.

The operation of the apparatus will now be readily understood in view of the above description. Let us assume that the tool 19 is to be introduced into the bore 14 of the work-piece so that the reversing valve 25 is arranged so that pressure oil from the pump 23 passes through the reversing valve 25 and the conduit 26 to the outboard end of the cylinder 21. This operates through the piston rod 22 to move the table 16 and the tool 19 to the left of FIG. 1. In order that the cylinder may operate, however, it is necessary that the other end of the cylinder be connected through the conduit 27 to exhaust or drain. The reversing valve in this condition connects the conduit 27 to the drain line 28 which, in turn, is connected to the inlet port 31 of the flow control valve 29. This valve, in effect, controls the drainage of hydraulic fluid from the cylinder 21 to the reservoir 24 in a manner which, in turn, regulates the motion of the table 16. The plunger 36 is reciprocated in its bore 35. When it is at the left end of its stroke, the groove 49 is in alignment with a passage 53 leading to the interior of the bore 42 in the plunger. Pressure oil from the inlet port 31 enters the chamber 54 formed by the inner part of the bore 42 and the piston 43 as well as the stem 44. The pressure fluid pushes the piston 43 to the right against the pressure of the coil spring 45 so that energy is stored in the spring 45. At that time, the plunger begins to more to the right in its bore 35 and the passage 53 is no longer coextensive with the groove 49, so that the pressure fluid in the chamber 54 is locked there. Subsequently, the plunger 36 moves far enough to the right so that a passage 55 extending through the wall of the plunger from the chamber 54 becomes coextensive with the groove 51 which is connected to the outlet port 32 of the valve. When this happens the pressure of the spring 45 on the piston 43 presses the piston 43 to the left and squeezes oil out of the chamber 54 until the pressure of the oil in the chamber 54 reaches that of drain or the stem 44 strikes the bottom of the bore 42. It can be seen that by the operation of the valve 29, a small slug or increment of hydraulic fluid has passed from the stem side of the cylinder 21 to the reservoir 24 so that the valve 29 acts as an incremental dispenser. This operation takes place, of course, in accordance with the speed at which the cam 38 is reciprocated. As the plunger 36 moves in and out in its bore, it picks up oil at the inlet port 31, stores it in the accumulator represented by the piston 43 and the spring 45 and then releases this accumlated energy into the outlet port 32.

Figure 2:
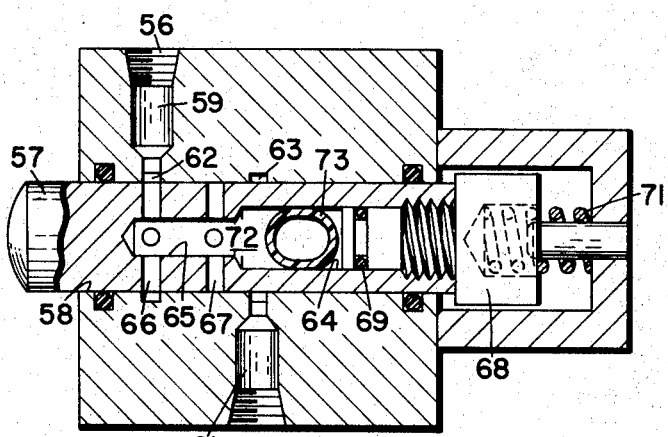
FIG. 2 is a sectional view of a modified form of a valve used in the machine tool.

FIG. 2 shows a modified version of the flow regulating valve in the form of a valve 56 which is provided with a plunger 57 which is reciprocable in a bore 58. The valve body has an inlet port 59 and an outlet port 61. The inlet port 59 is connected to a groove 62 in the bore 58, while the outlet port 61 is connected to a similar longitudinally spaced groove 63 formed in the bore. Extending into the inner end of the plunger 57 is a bore 64 having an inner reduced portion 65. Extending from the reduced portion 65 is a first set of passages 66 and a second spaced set of passages 67. A plug 68 is threaded into the outer end of the bore 64 and is provided with a piston portion 69 which seals the bore. A coil spring 71 presses the plunger to the left at all times. Located in the chamber 72 defined by the portion of the bore 64 inwardly of the piston portion 69 of the plug and the reduced portion 65 is a pressure accumulator, such as a hollow body 73 formed of an elastomer material. This hollow body contains a gas and is capable of being compressed and expanded indefinitely. The operation of this valve will be readily understood. The plunger 57 in its first position aligns the passages 66 with the groove 62 so that pressure fluid from the inlet port 59 passes into the chamber 72. The hydraulic pressure operates against the hollow body 73 and compresses it and the gas within it to store the fluid energy. Then the plunger 57 moves to the right so that the passages 66 and the groove 62 are no longer coextensive. Eventually, the passages 67 reach the groove 63 leading to the outlet or exhaust port 61. At that time, the fluid is pressed out of the port to the reservoir by he expansion action of the hollow body 73 which acts as an accumulator and energy storage means. As soon as the hollow body 73 has expanded the oil ceases to flow from the outlet port 61 and the pulse or dispensing function of the valve has been completed. The plunger 57 returns to its original position to pick up another increment of fluid flow.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
  (a) a base,
  (b) a workholder and a toolholder mounted on the base,
  (c) a hydraulic actuator for producing relative movement between the workholder and the toolholder for providing a machining operation,
  (d) apparatus for producing incremental flow through the hydraulic actuator, the said apparatus including a valve having a plunger, a cam engaging the plunger for reciprocating the same, and a motor rotating the cam, and
  (e) a pressure accumulator associated with the valve.

2. A machine tool as recited in claim 1, wherein the pressure accumulator is in the form of a spring-loaded plunger.

3. A machine tool as recited in claim 1, wherein the pressure accumulator is in the form of a bag formed of an elastomer material.

References Cited

UNITED STATES PATENTS 2,350,117　5/1944　Kline _____ 77—33.5
2,613,703　10/1952　Calvert _____ 91—35

GERALD A. DOST, Primary Examiner

U.S. Cl X.R.

91—35